United States Patent
Katsumata et al.

(10) Patent No.: US 8,536,752 B2
(45) Date of Patent: Sep. 17, 2013

(54) VOLTAGE REGULATED PERMANENT MAGNET MACHINE

(75) Inventors: Shin Katsumata, Rockford, IL (US); Jacek F. Gieras, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 174 days.

(21) Appl. No.: 13/176,087

(22) Filed: Jul. 5, 2011

(65) Prior Publication Data
US 2013/0009584 A1 Jan. 10, 2013

(51) Int. Cl.
*H02K 1/00* (2006.01)
*H02K 21/12* (2006.01)
*H02P 9/40* (2006.01)

(52) U.S. Cl.
USPC ............ 310/191; 310/156.01; 318/491

(58) Field of Classification Search
USPC ........... 318/491; 310/156.01, 156.24, 117, 310/209, 216.076, 26; 322/50–52, 57
IPC .................. H02K 19/34, 23/44; H02P 9/40
See application file for complete search history.

(56) References Cited

U.S. PATENT DOCUMENTS

| | | | | |
|---|---|---|---|---|
| 2,564,320 A | * | 8/1951 | Brainard | 322/28 |
| 5,450,373 A | * | 9/1995 | Kupiszewski et al. | 367/142 |
| 7,218,067 B2 | * | 5/2007 | Marioni | 318/118 |
| 2008/0169717 A1 | * | 7/2008 | Takashima et al. | 310/114 |

FOREIGN PATENT DOCUMENTS

JP 09233887 A * 9/1997

OTHER PUBLICATIONS

Pavlovic, D.; Stone, F.; , "Development of ductile high-strength FeCo-2V sheet," Magnetics, IEEE Transactions on , vol. 5, No. 3, pp. 390-391, Sep. 1969.*
Machine Translation, JP 09233887 A, Sep. 5, 1997.*

* cited by examiner

*Primary Examiner* — Tran Nguyen
*Assistant Examiner* — Thomas Truong
(74) *Attorney, Agent, or Firm* — Kinney & Lange, P.A.

(57) ABSTRACT

A permanent magnet generator comprises a stator core, a plurality of windings situated on the stator core, and a plurality of stress elements. The stress elements apply or relieve mechanical stress in response to control signals from a generator controller, thereby increasing or reducing voltage across the stator windings.

22 Claims, 2 Drawing Sheets

US 8,536,752 B2

VOLTAGE REGULATED PERMANENT MAGNET MACHINE

BACKGROUND

The present invention relates generally to permanent magnet generators, and more particularly to methods and systems for regulating voltage in permanent magnet generators.

Rotary generators convert mechanical torque into electrical power by inducing stator voltages using a magnetized rotor, or inducing rotor voltages using a magnetized stator. In either case, the magnetized element moves relative to a plurality of windings, producing a varying magnetic flux through those windings which induces a current and voltage according to Faraday's Law. For the purposes of this discussion, a magnetized rotor and a stator with a plurality of induction windings will be assumed, although one skilled in the art will recognize that this configuration can be reversed.

Permanent magnet generators provide magnetic fields with permanent magnets such as rare earth magnets, and have numerous advantages over wound field rotor synchronous generators. As long as a permanent magnet rotor rotates, it produces a varying magnetic field. Whenever this magnetic field passes through stator windings of the permanent magnet generator, the resulting changing magnetic flux induces currents and voltages on the windings. This simplicity and reliability is useful in a variety of applications, but makes de-energizing a permanent magnet generator difficult. Stator faults and changes in power requirements can necessitate rapid changes to induced voltage. Stator faults between windings or phases of a rotary generator, in particular, can cause rapid component deterioration if voltages are not immediately curtailed upon fault detection. In wound field generators, the field excitation voltage can be controlled by rapidly demagnetizing the rotor. In permanent magnet generators, alternative methods are needed, since a permanent magnet rotor cannot be demagnetized, and mechanically halting rotation may be infeasible or slow.

A variety of techniques have been developed for this purpose to cancel of divert magnetic flux away from stator windings. Some permanent magnet generators utilize mechanical bridges which can be closed to provide alternative flux paths. Others provide persistent flux paths which are magnetically saturated during ordinary generator operation, but which are desaturated to divert flux away from stator windings during fault conditions. Still other approaches rely on control windings to produce countervailing flux which to cancel net flux through stator windings. Although a multitude of approaches have been proposed to de-energize permanent magnet generators, no single approach dominates the field.

SUMMARY

The present invention is directed toward a stator for a permanent magnet generator. The stator comprises a stator core, a plurality of stator windings situated on the stator core, and a plurality of stress elements. The stress elements apply or relieve mechanical stress on surrounding sections of the stator in response to control signals from a generator controller, thereby reducing or increasing voltage across the stator windings.

DETAILED DESCRIPTION

Figure 1:
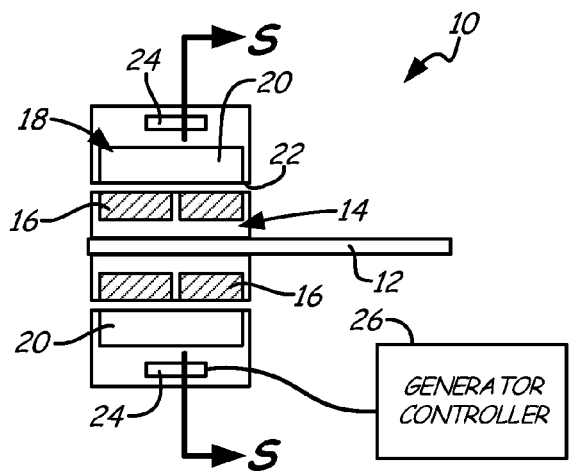
FIG. 1 is a simplified cross-sectional view of a permanent magnet generator having a stator and a permanent magnet rotor.

FIG. 1 depicts permanent magnet generator 10, comprising shaft 12, rotor 14, permanent magnets 16, stator 18, windings 20, and air gap 22, stress elements 24, and generator controller 26. Rotor 14 is a substantially cylindrical structure mounted on shaft 12, and containing permanent magnets 16. Permanent magnets 16 produce a persistent magnetic field about rotor 14. Stator 18 is a hollow, substantially cylindrical structure which fits about rotor 14, and is separated from rotor 14 by air gap 22. Stator 18 contains a plurality of windings 20 for generating power, and a plurality of stress elements 24 which expand to apply or relieve mechanical stress. The stress elements are controlled by generator controller 26. Generator controller 26 is a conventional generator controller which may perform a variety of regulation and control tasks related to the operation and diagnostics of permanent magnet generator 10.

Shaft 12 is driven by a mechanical power source such as a gas or wind turbine, and rotates rotor 14. Permanent magnets 16 produce magnetic fields which span air gap 22 and penetrate windings 20, producing magnetic flux through windings 20 dependent on the area of windings 20, and on the strength of magnetic fields from permanent magnets 16 at windings 20. As shaft 12 and rotor 14 rotate, permanent magnets 16 move about shaft 12, causing the magnetic flux through windings 20 to change. This changing flux induces voltages across windings 20 according to Faraday's law. The total induced voltage across windings 20 represents power extracted by permanent magnet generator 10 from the mechanical power source. So long as permanent magnets 16 continue to move relative to windings 20, the resulting changing flux through windings 20 will continue to induce voltage. This is useful for power production, but necessitates some means for rapidly canceling or controlling voltage while rotor 14 turns, particularly in the event of short circuit faults across or between windings 20. To this end, flux is controlled within stator 18 by applying or relieving mechanical stress on stator 18 with stress element 24 in response to control signals from generator controller 26, as described below with respect to FIGS. 2-5. Generator controller 26 monitors the voltage output of permanent magnet generator 10, and regulates voltage by controlling stress elements 24 with control signals so as to maintain or adjust generator voltage, as described in detail below. Generator controller 26 may also monitor temperatures, currents, or voltages within windings 20 so as to detect shorts and other generator faults, and reactively de-energize permanent magnet generator 10 using stress elements 24 so as to avoid component damage.

Figure 2:
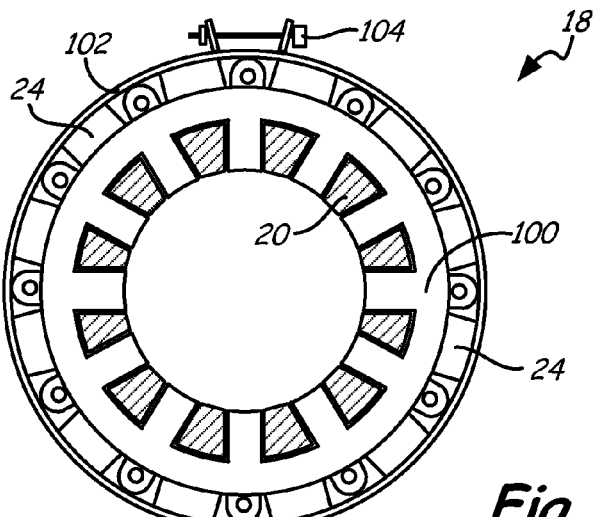
FIG. 2 is a cross-sectional view of one embodiment of the stator of FIG. 1.

FIG. 2 is a cross section of one embodiment of stator 18 through section line S-S of FIG. 1. Stator 18 comprises windings 20, stator core 100, tension ring 102, tension adjust 104, and stress elements 24. Windings 20 are coils of wound conductive wire in which rotation of rotor 14 induces current. Stator core 100 is a substantially cylindrical structure of ferromagnetic material which supports windings 20 and provides a flux path for magnetic fields generated by permanent magnets 16 (see FIG. 1). Tension ring 102 is a rigid hoop or cylindrical casing surrounding stator core 100 and binding stress elements 24 to stator core 100. Tension adjust 104 an element such as a knob or screw adjustable to control the radially inward force applied by tension ring 102 on stator core 100. Stress elements 24 are blocks or laminates of material which expand or contract in response to control signals, such as piezoelectric or mechanical actuators. Control signals are provided by a generator controller 26, or by other control electronics.

During power production, magnetic fields produced by permanent magnets 16 penetrate stator core 100 to pass through windings 20. Changes in magnetic flux through windings 20 induce voltages across windings 20, producing electrical power. The total flux which can pass through windings 20 is limited by the magnetic permeability of stator core 100. In the embodiment of FIG. 2, stator core 100 is formed of a material that exhibits variable magnetic permeability under mechanical stress, such as FeCo-2V. At a high magnetic permeability state, stator core 100 is permeable to substantially all magnetic fields permanent magnets 16 of rotor 14 are capable of producing, allowing efficient induction of voltages on windings 20. At a low magnetic permeability state, stator 100 acts as a barrier to magnetic fields, preventing substantially any magnetic flux from passing through windings 20, and halting induction of currents and voltages on windings 20. Stress elements 24 expand or contract in response to control signals from generator controller 26 to apply or relieve stress on stator core 100, thereby controlling the magnetic permeability of stator core 100. Tension ring 102 prevents stress elements 24 from expanding outward, thereby ensuring that any expansion of stress elements 24 applies pressure to stator core 100, rather than bowing or bulging radially outward away from stator core 100.

In one embodiment, stator 18 is constructed such that stress elements 24 apply pressure to stator core 100 only in response to a control signal from generator controller 26. In this embodiment, stator core 100 normally operates in a high magnetic permeability state, but shifts to a low magnetic permeability state when stress is applied by expansion of stress elements 24. In another embodiment, stator 18 is constructed such that stress elements 24 persistently apply pressure to stator core 100, and contract only in response to a control signal from generator controller 26, thereby relieving stress on stator core 100. In this embodiment, stator core 100 normally operates in a low magnetic permeability state, but shifts to a high magnetic permeability state when stress is relieved by contraction of stress elements 24.

Voltage across windings 20 is regulated by applying or reducing the control signal generator controller 26 applies to stress elements 24. In this way, permanent magnet generator 10 can be rapidly de-energized in response to faults and changing power requirements, even while rotor 14 continues to rotate.

Figure 3:
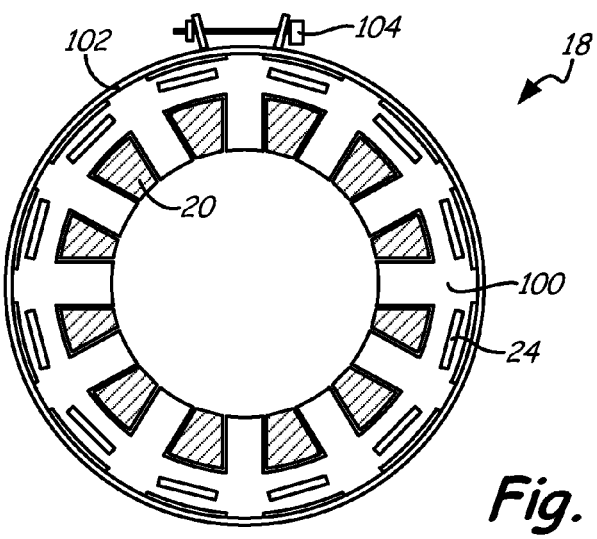
FIG. 3 is a cross-sectional view of a second embodiment of the stator of FIG. 1.

FIG. 3 depicts an embodiment of stator 18 similar to that depicted in FIG. 2. The embodiment of FIG. 3 comprises all of the same elements as the embodiment of FIG. 2, which serve the functions described above. Stator core 100 of FIG. 3 encloses stress elements 24, such that expansion of stress elements 24 in response to control signals applies pressure to stator core 100 from all sides of stress elements 24, causing mechanical stress. Tension ring 102 applies force (adjustable with tension adjust 104) to prevent stator core 100 from bowing or bulging radially outward to relieve pressure applied by stress elements 24. As described above, stress elements 24 may expand to apply stress in response to control signals, or may be expanded by default, and contract to relieve stress in response to control signals. In either case, control signals to stress elements 24 have the effect of varying the magnetic permeability of stator core 100, and increasing or decreasing voltages across windings 20, as desired.

Figure 4:
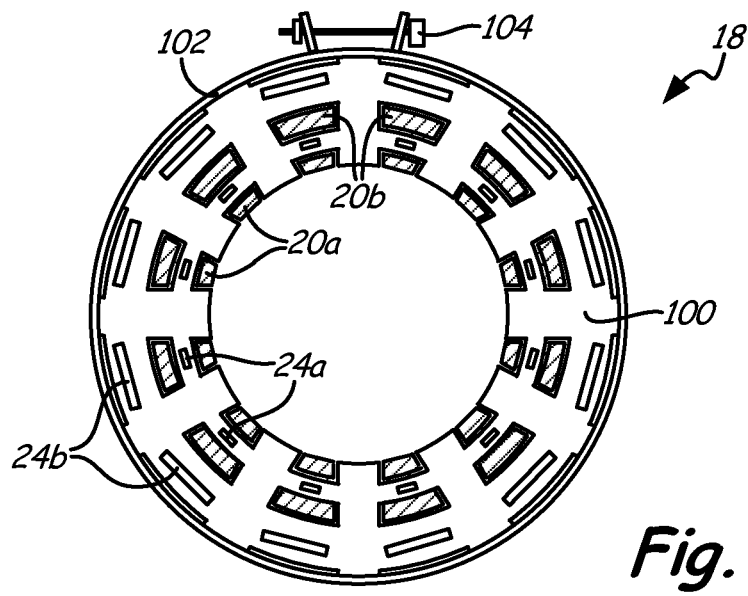
FIG. 4 is a cross-sectional view of a third embodiment of the stator of FIG. 1.

FIG. 4 depicts an embodiment of stator 18 similar to that depicted in FIGS. 2 and 3. The embodiment of FIG. 4 comprises radially divided inner and outer winding sections 20a and 20b, respectively, and inner and outer stress elements 24a and 24b, respectively, but otherwise parallels the embodiment of FIG. 2. Outer stress elements 24b are identical to stress elements 24 of FIG. 3, while inner stress elements 24a are located within a radially inner section of stator core 100 separating inner and outer winding sections 20a and 20b, such that outer winding section 20b is radially bracketed by inner and outer stress elements 24a and 24b, respectively. This embodiment provides increased flux cancellation as compared to the embodiments of FIGS. 2 and 3, but operates substantially identically: expansion or contraction of inner and outer stress elements 24a and 24b applies or relieves stress in stator core 100, altering the magnetic permeability of stator core 100, and thereby decreasing or increasing, respectively, the voltage induced across winding sections 20a and 20b by rotation of permanent magnets 16.

Figure 5:
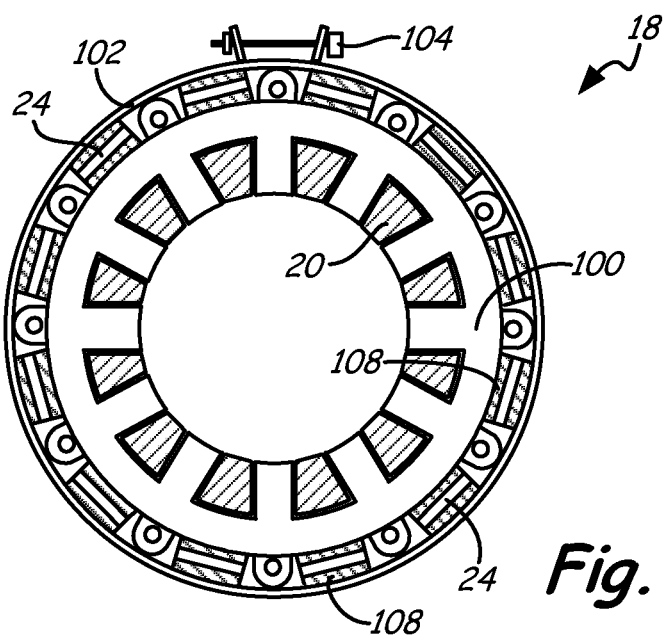
FIG. 5 is a cross-sectional view of a fourth embodiment of the stator of FIG. 1.

FIG. 5 depicts an embodiment of stator 18 similar to that depicted in FIG. 2, but further incorporating a plurality of magnetostrictive elements 108. Magnetostrictive elements 108 are components which become magnetized in response to compressive stresses, such as galfenol or terfoneol laminates. Magnetostrictive elements 108 sandwich stress elements 24, such that expansion of stress elements 24 in response to a control signal compresses magnetostrictive elements 108, magnetizing them. The magnetic field produced by magnetostrictive elements 108 magnetically saturates stator core 100, so that magnetic fields from permanent magnets 16 cannot penetrate stator core 100 to pass through windings 20. Compression of magnetostrictive elements 108 thus halts change in flux through windings 20, eliminating induced voltages from rotation of rotor 14. In this way, control signals sent to stress elements 24 can cancel voltages in permanent magnet generator 10. This technique can be used instead of or in addition to the stress sensitive stator cores described above. In one embodiment, stator core 100 is formed of conventional conductive materials which do not significantly vary in magnetic permeability in response to stress, and voltage regulation is accomplished purely by magnetic saturation of stator core 100. In another embodiment, stator core 100 is formed of a material with magnetic permeability which diminishes under stress, as described with respect to FIGS. 2-4, and the expansion of stress element 24 in response to the presence or absence of a control signal both stresses stator core 100, reducing its magnetic permeability, and compresses magnetostrictive elements 108, magnetically saturating stator core 100. Although FIG. 5 parallels FIG. 2, embodiments comprising magnetostrictive elements 108 can also be constructed which are analogous to the embodiments of FIG. 3 or 4 by sandwiching stress elements 24 between magnetostrictive elements 108.

The present invention allows stator flux and voltage to be controlled using mechanical pressure applied by stress elements 24. This enables permanent magnet generator 10 to be rapidly de-energized in response to changing power needs, or in reaction to a stator fault, thereby avoiding costly damage which could otherwise necessitate lengthy maintenance times.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A permanent magnet generator comprising:
a stator core;
a permanent magnet rotor which rotates with respect to the stator core;
a plurality of stator windings situated on the stator core;
a generator controller which regulates operation of the permanent magnet generator; and
a plurality of stress elements located on the stator core and radially bracketing the stator windings so as to apply or relieve mechanical stress in response to an electrical control signal from the generator controller, thereby increasing or reducing voltage across the stator windings.

2. The stator of claim 1, wherein magnetic permeability of the stator core varies with mechanical stress, and wherein pressure from the stress element decreases the magnetic permeability of the stator core, reducing flux through the plurality of stator windings.

3. The stator of claim 2, wherein the stress elements apply pressure in response to the electrical control signal, mechanically stressing the stator core.

4. The stator of claim 2, wherein the stress elements apply pressure to the stator core in an absence of the electrical control signal, and contract to relieve stress on the stator core in response to the electrical control signal.

5. The stator of claim 2, wherein the stator core is formed of FeCo-2V.

6. The stator of claim 1, further comprising a magnetostrictive element which produces a magnetic field when compressed by the stress element, thereby magnetically saturating the stator core.

7. The stator of claim 6, wherein the magnetostrictive element comprises a galfenol or terfoneol laminate.

8. The stator of claim 1, further comprising a magnetostrictive element which produces a magnetic field when compressed by the stress element, thereby magnetically saturating the core, and wherein magnetic permeability of the stator core varies with mechanical stress, such that pressure from the stress element causes a change in the magnetic permeability of the stator core, reducing flux through the plurality of stator windings.

9. A stator for a permanent magnet generator, the stator comprising:
a stator core;
a plurality of stator windings situated on the stator core; and
a plurality of stress elements which apply or relieve mechanical stress on surrounding sections of the stator in response to an electrical control signal, thereby increasing or reducing voltage across the stator windings, wherein at least some of the plurality of windings are radially bracketed by the stress elements.

10. The stator of claim 9, wherein the stress element is a piezoelectric actuator which applies mechanical pressure to surrounding sections of the stator in response to a control signal.

11. The stator of claim 9, further comprising a tension ring surrounding the stator, the tension ring applying a radially inward force on the stator which enables the stress elements to apply mechanical pressure to surrounding sections of the stator.

12. The stator of claim 11, wherein the tension ring is adjustable to vary the magnitude of the radially inward force.

13. The stator of claim 9, wherein the stress element is surrounded by the stator core.

14. A method for controlling voltage in a permanent magnet generator, the method comprising applying mechanical pressure to at least one element of a stator in response to a control signal by constricting the at least one element between stress elements that radially bracket windings of the stator, thereby reducing magnetic flux through the windings of the stator.

15. The method of claim 14, wherein the at least one element of the stator comprises a magnetostrictive element which is magnetized by compression, and which magnetically saturates a stator core of the stator in response to mechanical pressure.

16. The method of claim 14, wherein the at least one element of the stator comprises a stress-sensitive stator core having magnetic permeability that varies as a function of mechanical pressure.

17. The method of claim 16, wherein the stress element expands in response to the control signal, stressing the stator core and causing the stator core to become less magnetically permeable.

18. The method of claim 16, wherein the stress element expands in an absence of a control signal, and contracts in response to a control signal, relieving stress on the stator core and causing the stator core to become more magnetically permeable.

19. The method of claim 14, wherein the at least one element of the stator comprises:
a stress-sensitive stator core which becomes less magnetically permeable in response to mechanical stress caused by pressure; and
a magnetostrictive element which is magnetized by compression, and which magnetically saturates the stress-sensitive stator core in response to mechanical pressure.

20. A stator for a permanent magnet generator, the stator comprising:
a stator core;
a plurality of stator windings situated on the stator core;
a plurality of stress elements which apply or relieve mechanical stress on surrounding sections of the stator in response to an electrical control signal, thereby increasing or reducing voltage across the stator windings; and
a tension ring surrounding the stator, the tension ring applying a radially inward force on the stator which enables the stress elements to apply mechanical pressure to surrounding sections of the stator.

21. The stator of claim 20, wherein the stress element is a piezoelectric actuator that applies mechanical pressure to surrounding sections of the stator in response to a control signal.

22. The stator of claim 20, wherein the tension ring is adjustable to vary the magnitude of the radially inward force.

* * * * *